July 22, 1924.
F. J. MÖLLER
ELECTRICAL HEATING UTENSIL
Filed March 20, 1922
1,502,315
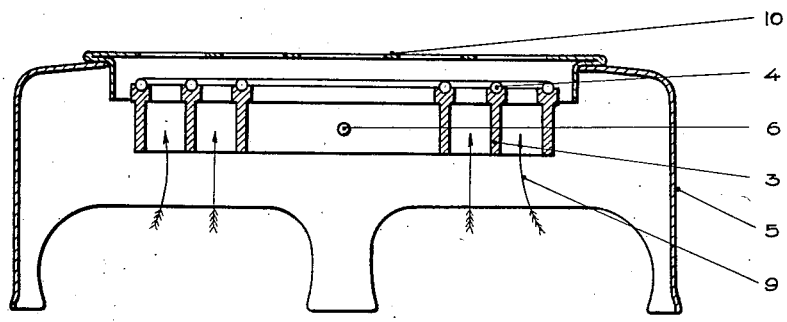
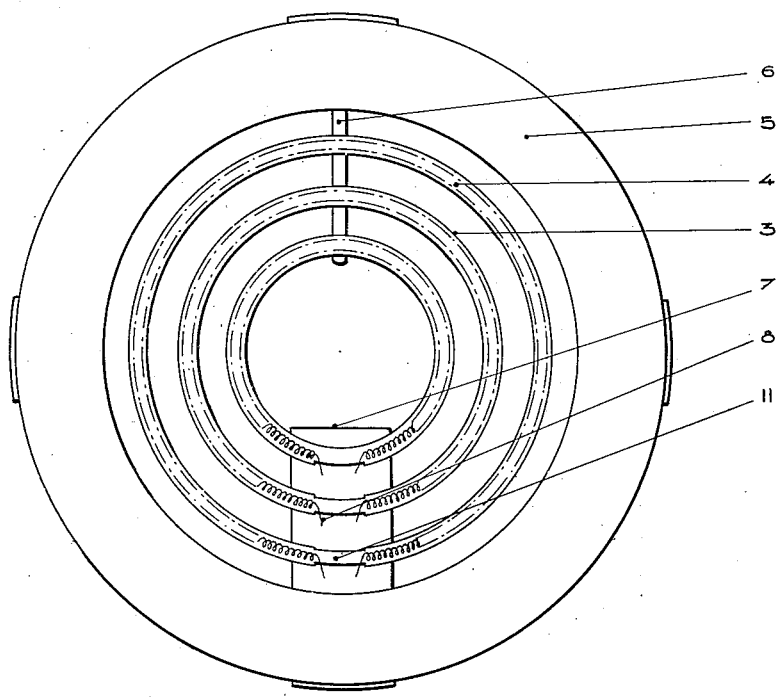
Inventor
F. J. Möller,
By Marks Clerk
Attys.

Patented July 22, 1924.

UNITED STATES PATENT OFFICE.

FREDERIK JOHAN MÖLLER, OF COPENHAGEN, DENMARK.

ELECTRICAL HEATING UTENSIL.

Application filed March 20, 1922. Serial No. 545,194.

*To all whom it may concern:*

Be it known that I, FREDERIK JOHAN MÖLLER. director, living at Gl. Kongevej 15, Copenhagen, in the Kingdom of Denmark, have invented certain new and useful Improvements in Electrical Heating Utensils, of which the following is a full, clear, and exact description.

My invention refers to electrical stoves, heating plates and other electrical heating utensils, containing an electrical heating resistance e. g. one or more spirals arranged in or on an insulating element.

The object of my invention is to increase the utility and effectivity of such heating utensils.

According to my invention the heating member consists of one or more straight or curved bar or raillike insulating elements in or on the upper edge of which the heating resistance is arranged; in many cases the bar or raillike element may form a polygon or circle or a similar closed or annular figure. Thus the heating member, as a whole, does not form a closed bottom liable to catch foreign particles as in the known utensils of this kind, but the heating member as a whole is "airy" and allows the arising of air currents almost as by cooking stoves with flames. Moreover, when closing the electrical circuit the heating member quickly becomes warm, and when warm the useless propagation of heat, not avoidable in the known heating utensils, is reduced to a minimum.

The invention is by way of example shown on the annexed drawing in Figs. 1 and 2 in a vertical section and a plan view respectively.

In the example shown the electrical heating member consists of a plurality of concentrically arranged annular elements 3 having a raillike section as shown in Fig. 1 and in the the upper edge of which the heating resistance e. g. a spiral 4 is arranged. The heating members 3, 4 are in a suitable manner fixed in a suitable casing 5 e. g. by means of one or more pins 6 or one or more shelves 7. The ends 8 of the spirals 4, being for the sake of simplicity shown as free in Fig. 2, may through contact pins or similar easily detachable means, be connected with the terminals on the shelf 7. As the electrical connections may be easily understood without further explanations, they are not shown on the drawing.

The heating utensil according to the invention is "airy". When in use an air current is created, as shown by the arrows 9, almost as in heating stoves with flames, and the air current will assist to the transmission of heat to the plane where the heat is to be received. Food and other foreign particles will not be caught by the heating member and cause destroyings but the particles may freely fall through, and the heating member easily be kept clean.

Above the members 3, 4 there may be a suitable grate or the like 10 as support for the cooking vessels or the like. Between the ends 8 of the heating spirals the elements 3 may be slitted, or they may have an incision 11, see Fig. 2.

Preferably the heating spiral 4 may be placed in such a way that a certain part e. g. two thirds or less of its sections lies freely over the upper edge of the insulating element 3 while the other part, viz. a third or more, is sunk down in the insulating element and brought into close touch with it by means of a suitable binding medium. Owing to its close contact with the insulating element the last mentioned part of the heating resistance is effectively guarded against loss of heat and thus the loss of heat of the heating resistance is chiefly laid over on the first mentioned part. Consequently, the balance between the heat quantities supplied at any moment by the current and the heat quantities lost at the same time through radiation or conduction, takes place at a higher temperature than if the whole resistance was regularly exposed to loss of heat, and accordingly the heating resistance placed in the manner described, will glow at a lower temperature than if the heating resistance was altogether surrounded by air or another heat conducting or heat transmitting medium.

I claim:

1. In an electric heater, a supporting structure for cooking utensils having a vertical opening therethrough to permit the passage of air, and a plurality of electrical heating elements supported in said supporting structure below the upper surface thereof and spaced one from the other whereby to permit of the passage of air therethrough.

2. In an electrical heater, a frame structure adapted to support cooking utensils upon its upper surface and having a vertical passageway therethrough for heated air, a plurality of electrical heating elements, and supporting means for said heating elements, said supporting means being mounted in the frame structure and consisting of a plurality of vertically elongated members arranged in spaced relation whereby to permit of the free passage of heated air therethrough.

In witness whereof I subscribe my signature.

FREDERIK JOHAN MÖLLER.